(12) United States Patent
Wang et al.

(10) Patent No.: US 8,018,627 B2
(45) Date of Patent: Sep. 13, 2011

(54) SHARED IMAGE SCANNING METHOD AND PICTURE SCANNER THEREOF

(75) Inventors: Konson Wang, Taipei (TW); Ching-Yuan Lin, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 474 days.

(21) Appl. No.: 12/318,928

(22) Filed: Jan. 13, 2009

(65) Prior Publication Data

US 2010/0053700 A1 Mar. 4, 2010

(30) Foreign Application Priority Data

Aug. 27, 2008 (TW) .............................. 97132794 A

(51) Int. Cl.
*H04N 1/04* (2006.01)
(52) U.S. Cl. ........ 358/406; 358/474; 358/448; 358/450; 358/452; 359/201.1
(58) Field of Classification Search .................. 358/448, 358/450, 452, 474; 359/201.1
See application file for complete search history.

(56) References Cited

U.S. PATENT DOCUMENTS 6,169,621 B1 * 1/2001 Deter et al. ................ 359/201.1

FOREIGN PATENT DOCUMENTS

JP 1186077 A 7/1989

* cited by examiner

*Primary Examiner* — Kimberly A Williams
(74) *Attorney, Agent, or Firm* — WPAT, P.C.; Anthony King

(57) ABSTRACT

The present invention discloses a shared image scanning method and picture scanner thereof. The method includes the steps of: sharing a desired scanning document into image areas; constructing images captured from each image area into a whole document sensing image to be used by the scanner. The scanner includes reflecting mirrors, light source modules and image sensing modules in a frame. The reflecting mirrors are installed in the frame with an interval apart from each other and corresponding to the image areas. The light source modules project lights onto the image areas to produce document images which are captured by the corresponding image sensing module and converted into image signals, and processed by an image processing unit to produce a whole document sensing image signal. Thus, the scanner applying the shared image method of the present invention can complete a document scanning quickly.

12 Claims, 19 Drawing Sheets

SHARED IMAGE SCANNING METHOD AND PICTURE SCANNER THEREOF

BACKGROUND OF THE INVENTION

1. Field of the Invention

The present invention relates to a shared image scanning method and picture scanner thereof, and more particularly to a shared image scanning method and picture scanner that shares a document to a plurality of image areas, then construct the images to a whole document image signal The picture scanner is formed and is with features of fast scan and enhancing the scanning quality.

2. Description of the Related Art

In recent years, scanners, particularly picture scanners become one of the major computer peripherals, and picture scanners can capture the image of a document, a textual page, a picture, a film or even a planar object. In an image capturing method, a light is projected onto the document first. Further, a sensor such as a charge-coupled device (CCD) or a contact image sensor (CIS) is provided for converting the reflected light into a image signal, then a scanning software is provided for the image signal to form a image signal, and the image signal can be stored in an image file with a format of TIFF, EPS, BMP, GIF and PCX, etc. Since the document usually comes with areas of different brightness, the intensity of the reflected lights in different areas of the document varies; different types are developed to enhance the shortage. Commercialized scanners are divided into three types: a flat-bed scanner, a transparent media adapter scanner and a drum scanner.

The flat-bed scanner is used for scanning pictures, documents or printed matters. In a scanner has a transparent plate made of glass or plastics and installed on the top of scanner for placing a desired scanning document, a CCD module (CCDM) for sensing component moves along a track to scan the document row by row (called, sequence line scanning) and converts the image of the document into a digital data. The flat-bed scanner is the most frequently used in application of simple document. Other scanners manufactured by the similar principle of the aforementioned scanner based on the relative movement of the document and the CCDM include handheld scanners and sheetfed scanners.

In the transparent media adapter scanner, a mask is installed on the scanner for uniformly projecting a light source to scan a script such as a transparency and a film.

The drum scanner adopts a photomultiplier tube (PMT) as a light sensing device. The PMT technology can focus bright light beams at a very small area of a picture at one time, such that the drum scanner exposed all layers to be shown in a dense area of the original script. The drum scanner is used mainly in large picture, engineering drawing or professional advertising and picture producing companies.

With reference to FIGS. 1 and 2 for a perspective view and a cross-sectional view of a conventional flat-bed scanner respectively, the scanner comprises: a frame 11, a transparent plate 12, an image sensing module 13 and two guide tracks 14. The transparent plate 12 is installed at the top of the frame 11, and a document 15 is placed on the top of the transparent plate 12. The guide track 14 is installed on both sides inside the frame 11 for guiding and moving the image sensing module 13. The image sensing module 13 includes a light source which can be a xenon lamp or a cold cathode fluorescent lamp (CCFL) 131, a reflective base 132, a cylindrical lens 133, a line image sensor 134 and a printed circuit board 135. The cold cathode fluorescent lamp 131 is used for projecting a light source. The reflective base 132 is used for collecting and focusing the light emitted from the cold cathode fluorescent lamp 131 onto a document 15. The cylindrical lens 133 is used for focusing the light source onto the line image sensor 134. The printed circuit board 135 is carried by and electrically coupled to the line image sensor 134. For different line image sensors 134, a linear CCD image sensor or a contact image sensor (CIS) is used. In the selection of these two types of image sensors, the CCD technology is well developed and has the features of less noise, plentiful color, profound depth of field, and capability of scanning a piece paper with folded lines. However, the CIS including the CMOS image sensor featuring a simple manufacturing procedure and a small thickness for manufacturing a super thin scanner, and having the drawbacks of a shallower depth of field, and the requirement of a flat scanned draft, incapability of scanning 3D objects, and a poor noise resistance that affects the image quality of the document.

When a document 15 is scanned, a step motor is used for driving and moving the guide track 14, such that the guide track 14 drives and moves the image sensing module 13 in a scanning direction for the image sensing module 13 to scan the document 15. However, the drawback of such conventional scanner resides on that the guide track 14 needs to drive and move the image sensing module 13 towards the scanning direction to complete scanning a whole copy of the document 15, and thus causing a low scanning speed. Since gears of the step motor are engaged for driving and moving the guide track 14 and the image sensing module 13, vibrations may occur due to a low tolerance or precision, and the document 15 cannot be detected accurately such that a poor image quality may result. In the present product development, the optical resolution of the image sensing module 13 refers to the number of image points captured by the light sensing device per inch, and the optical resolution can be up to 2400 dpi. As to a product with an acceptable price in the market, the mechanical resolution of the step motor and the guide track 14 refers to the number of steps moved by the step motor of the light sensing device per inch is lower than 1200 dpi. Contrarily, if the step motor is driven by a high precision ball bearing, the resolution can be simulataneous improvement, but it also incurs a higher cost. Therefore, the present manufacturing technology cannot match the optical resolution with the mechanical resolution, and the actual image resolution cannot be improved further.

The conventional flat-bed scanner has another drawback that the design of present scanners tends to be light, thin, short and compact, and thus the distance between the document 15 and the line image sensor 13 is too small, and the field of view (FOV) becomes larger. If the document 15 has a folded line, then the document 15 with the folded line will have a focus deviation and an image of the document cannot be formed accurately on the line image sensor 134, thus blurred the document image.

Since the scanning method using a guide track to drive a light sensing device still has limitations, Japan Patent No. JP 1186077 discloses a method of using five CCD image sensors to capture an image of a document by dividing the documents into several areas. However, if such technology is applied to a scanner, the CCD image sensors and an image forming lens must be maintain at a long distance from the target document 15, so that the image forming lens can focus a document image onto the image sensors, and the thickness of the scanner must be very thick and does not meet the user requirements. Similarly, once an image forming lens of a wide angle short back focal length is used, the image distance can be shortened, but the depth of field will be insufficient. In a scanner as disclosed in Japan Patent No. JP6098098, the document image is refracted, and different image areas form images onto image sensors by a plurality of image forming lenses. However, such patented technology still has the issue of mechanical resolution with respect to the movement of the document and the image sensor.

As the image sensor advances, the area image sensor can capture a whole picture with two-dimension in each exposure time. For applications, it is not necessary to move the the document or the sensor to facilitate applying the image sensor to the scanner. In recent years, the price of the area image sensor drops drastically, and the area image sensor can be applied extensively to the scanner.

SUMMARY OF THE INVENTION

Therefore, it is a primary objective of the present invention to provide a shared image scanning method to overcome the shortcomings of the prior art that completes the scanning of a document row by row and results in the issues of a slow scanning speed and a low image scanning resolution.

To achieve the foregoing objectives, the present invention provides a shared image scanning method applied to a scanner, and the scanner comprises at least one light source module, a plurality of reflecting mirrors and a plurality of image sensing modules, and the shared image scanning method comprises the steps of: sharing a document into a plurality of image areas, and each image area having corresponding reflecting mirror and image sensing module; turning on a light source module to project light onto the document of each image area to form a document image. The document image of the image area is reflected by the reflecting mirror to the image sensing module, and the sensed image is converted by the image sensing module into image signal, and finally image signals are constructed by an image processing module to form a whole document sensing image signal. The image processing module uses a trapezoid calibration method to calibrate the image signal.

To achieve the foregoing objectives, the present invention provides a scanner comprising a frame, a plurality of reflecting mirrors, a plurality of image sensing modules and a light source module. The reflecting mirrors are installed with an interval apart from each other in the frame for distributing a plurality of image areas. The light source module includes at least one light source module installed in the frame. The image sensing module is installed in the frame for converting a plurality of document images of a plurality of corresponding image areas into image signals. The light source is projected onto a document, and a plurality of document images are produced according to the plurality of image areas, and each document image is reflected from the corresponding reflecting mirror and incident into the image sensing module, and the document image is converted into a image signal by the image sensing module, and each image signal is used by an image processing module for the image processing to output a whole document sensing image signal.

The image sensing module includes an area image sensor and an imaging lens unit, and the imaging lens unit is composed of at least one lens for focusing the reflected document image at the area image sensor, and the area image sensor converts the image into the image signal.

The imaging lens unit further includes a fθ lens capable of calibrating the trapezoid phenomenon produced by the reflected document image.

The shared image method and the scanner using the method in accordance with the present invention include one or more of the following advantages:

(1) The image sensing module of the scanner captures an image of a corresponding image area by each image sensing module without the need of moving the image sensing module or the target scanning document for scanning the image, so as to provide a quick and easy way of scanning a document.

(2) This scanner scans an image of a document without the need of using the guide track to drive and move the image sensing module. The invention not only avoids a poor scanning quality caused by vibrations of the image sensing module, and prevents the mechanical resolution from falling below the optical resolution which will be unable to improve the image quality.

(3) This scanner scans an image by the virtual image of the reflecting mirror to reduce the field of view of the image lens of the image sensing module and increase the depth of field, so that we still can see a document having a folded line clearly after the scanning.

DETAILED DESCRIPTION OF THE PREFERRED EMBODIMENTS

The structure and technical characteristics of the present invention will become apparent with the detailed description of preferred embodiments with accompanying drawings as follows. In the preferred embodiments of a shared image scanning method and a scanner using the method, the applications of scanning A4 or A3 sized documents are used for illustrating the invention, but those ordinarily skilled in the art should understand that the design and application of a general scanner can be applied to the present invention, and the number of image areas distributed by the shared image scanning method of the invention can be 2, 3 or more based on the size of the document and the resolution. The image processing method or image computation method is not limited to the following image processing method, and the components of the scanner disclosed in the present invention are not limited to the structure illustrated in the preferred embodiments only, but numerous changes, modifications, or equivalents can be made. For instance, the light source module includes but not limited to a cold cathode fluorescent lamp, a light emitting diode or a xenon lamp. The number of lens, the diopter, and the optical design for the image lens of the lens module are not limited, and the area image sensors are not limited to CCD, CIS or CMOS image sensors.

Figure 1:
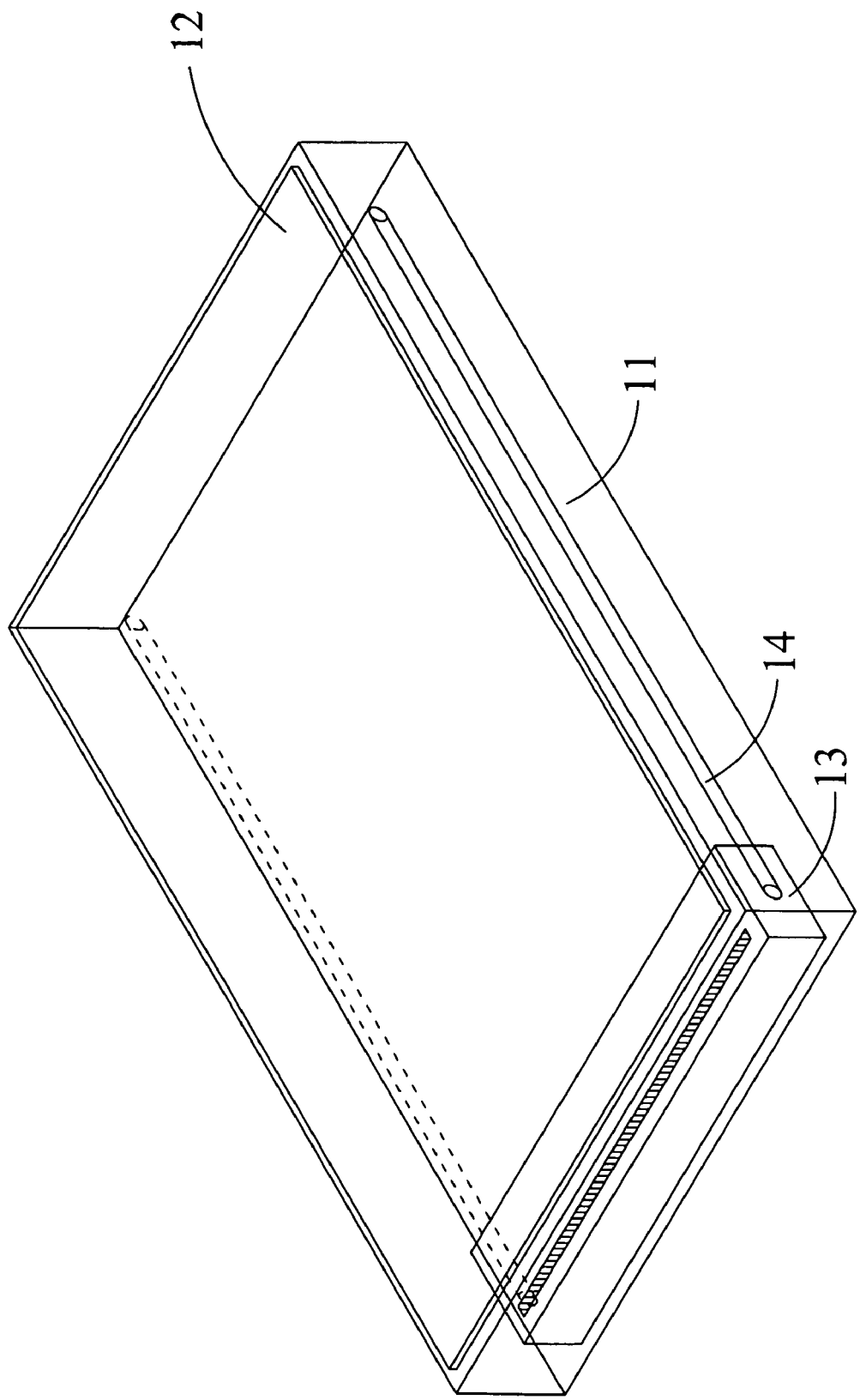
FIG. 1 is a perspective view of a conventional scanner.
Figure 2:
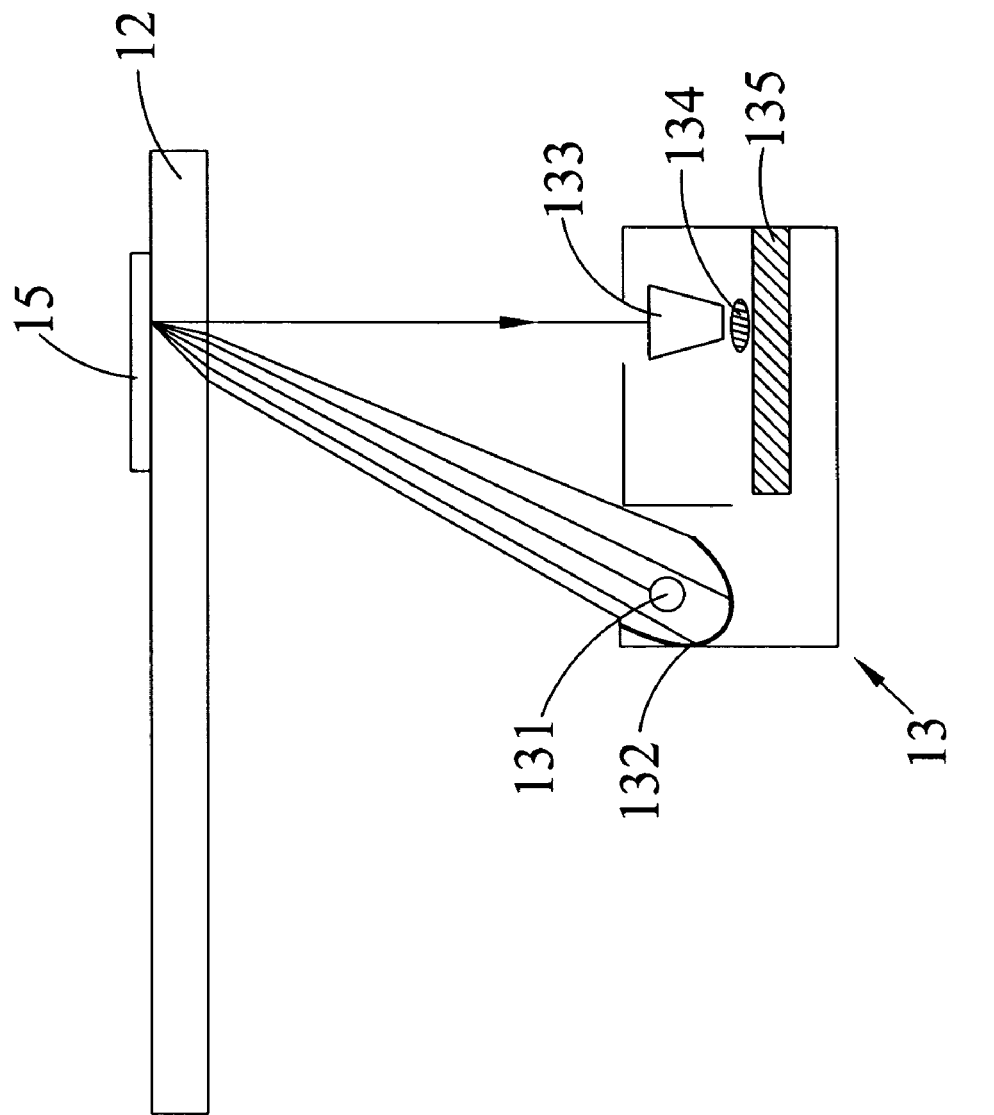
FIG. 2 is a cross-sectional view of a conventional scanner.
Figure 3:
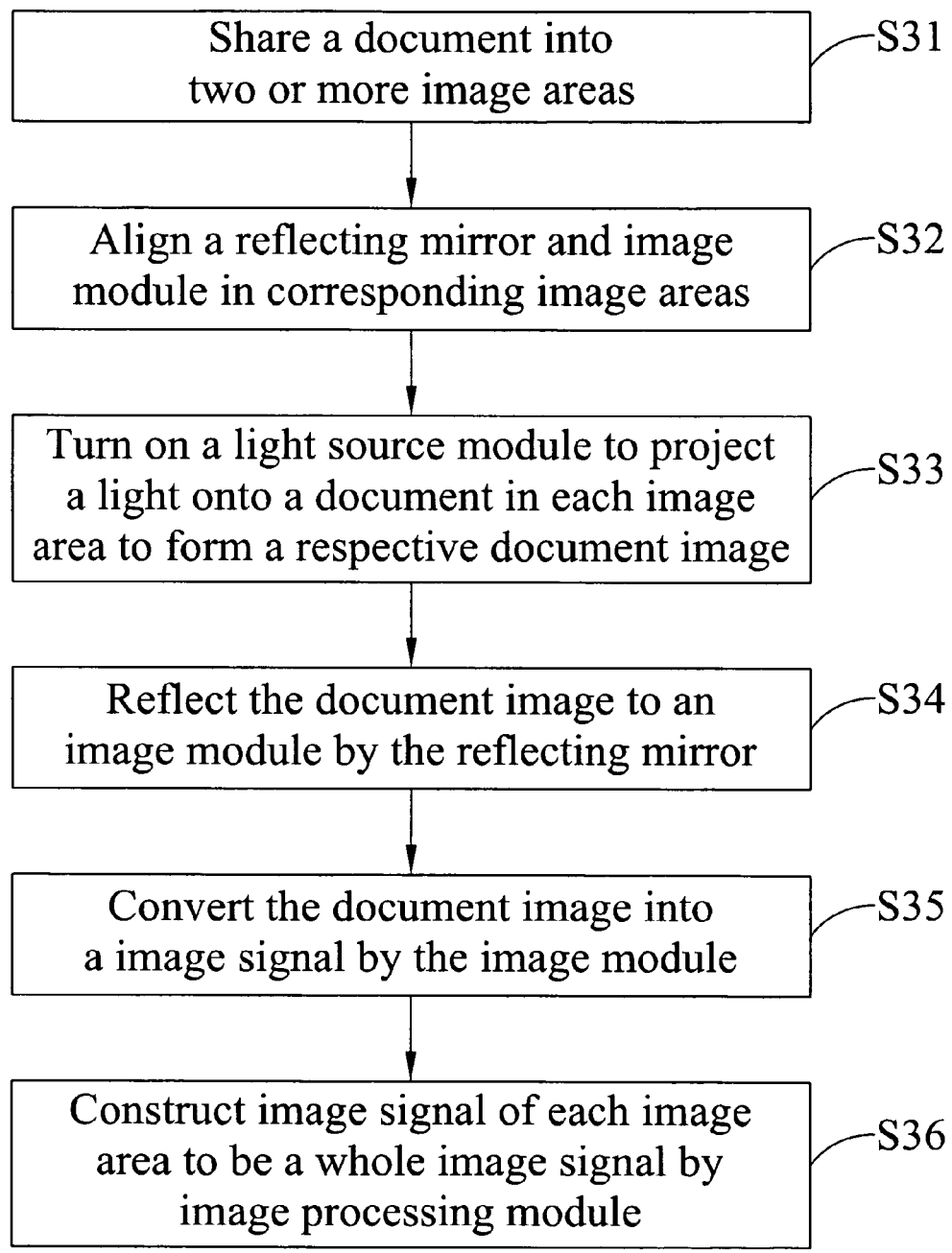
FIG. 3 is a flow chart of a shared image scanning method in accordance with the present invention.

With reference to FIG. 3 for a flow chart of a shared image scanning method in accordance with the present invention, a scanner using the shared image scanning method comprises at least one light source module, a plurality of reflecting mirrors, a plurality of image sensing modules and an image processing module, and the shared image scanning method comprises the steps of:

Step S31: sharing a document into two or more plurality of image areas;

Step S32: aligning reflecting mirrors and image sensing modules in corresponding image areas;

Step S33: turning on a light source module to project a light onto the document of each image area, and forming a document image; wherein the light project onto each image area simultaneously or separately;

Step S34: reflecting the document image to the image sensing module by the reflecting mirror;

Step S35: capturing and converting the document image into a image signal by the image sensing module; and Step S36: processing each image signal by an image processing module to construct a whole document sensing image signal.

Figure 4:
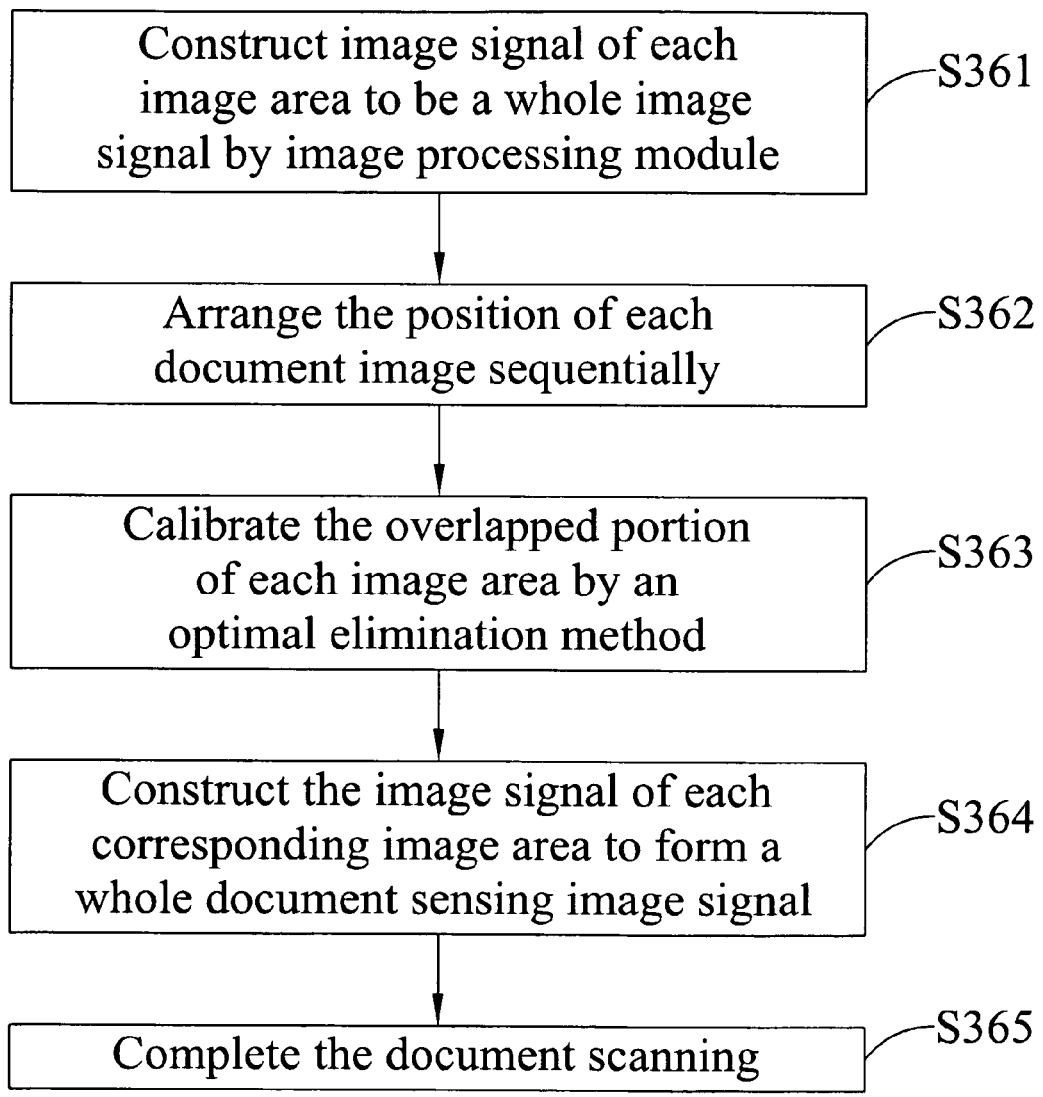
FIG. 4 is a flow chart of an image processing method of a module image processing that adopts a shared image scanning method in accordance with the present invention.

With reference to FIG. 4 for a flow chart of an image processing of an image processing module of a shared image scanning method in accordance with the present invention, the image processing method adopted by the image processing module in Step S36 comprises the steps of:

Step S361: using a trapezoid calibration method to calibrate the document image of each image area;

Step S362: arranging the position of each document image sequentially;

Step S363: using an optimal elimination calibration method to calibrate an overlapped portion of each image area;

Step S364: constructing the image signal of each image area into a whole document sensing image signal; and Step S365: completing a document scanning.

The image sensing module in Step S36 further can use an image interpolation algorithm to enhance the image pixels to improve the image resolution.

The trapezoid calibration in Step S361 includes a longitudinal (y-axis) trapezoid calibration and/or a transversal (x-axis) trapezoid calibration.

Figure 5:
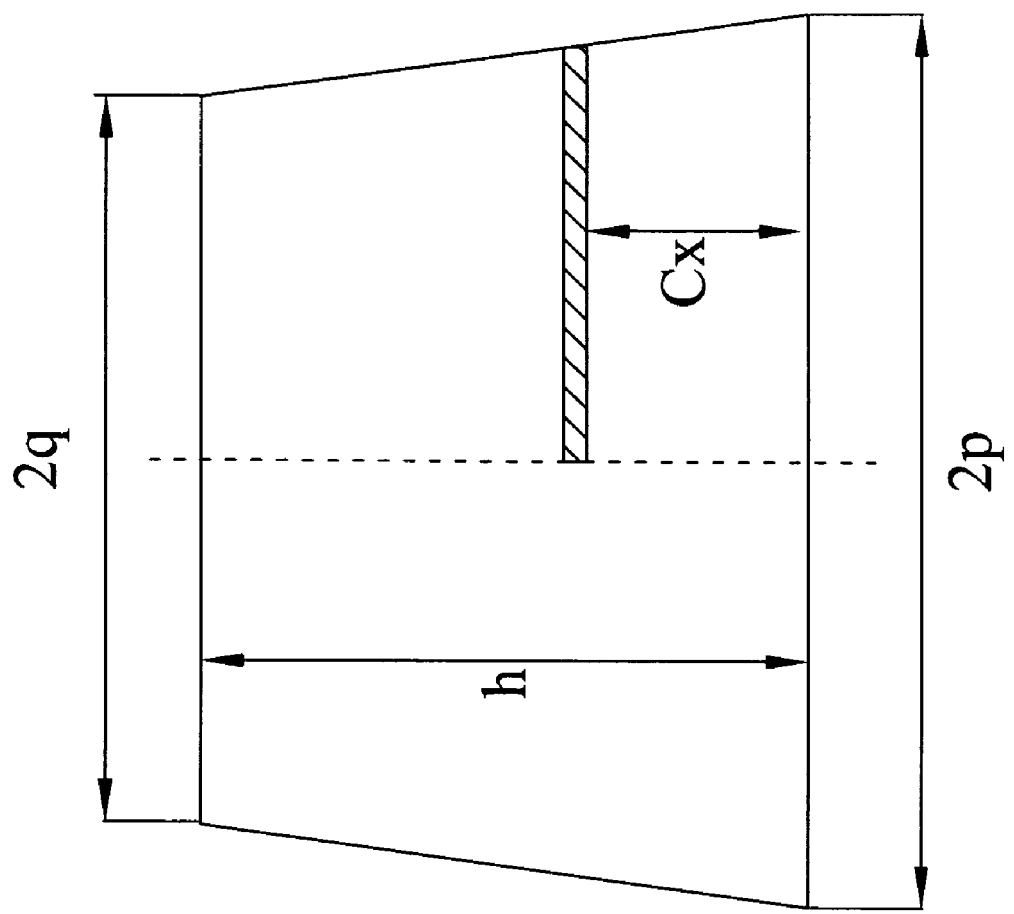
FIG. 5 is a schematic view of an image processing module that calibrates a transversal trapezoid image in accordance with the present invention.
Figure 6:
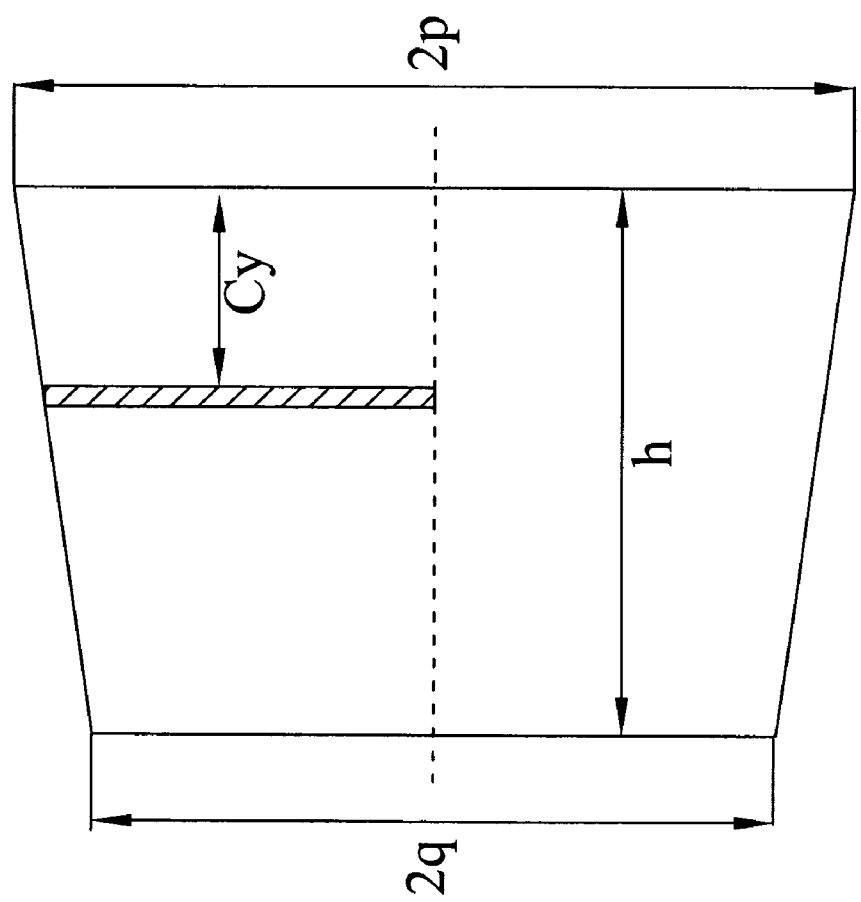
FIG. 6 is a schematic view of an image processing module that calibrates a longitudinal trapezoid image in accordance with the present invention.

With reference to FIGS. 5 and 6 for the detailed description of an image sensing module trapezoid calibration of a shared image scanning method in accordance with a preferred embodiment of the present invention, FIG. 5 shows a schematic view of an image processing module calibrating a transversal trapezoid image, and the transversal trapezoid image defines a pixel unit at the bottom edge and the top edge of each parallel transversal trapezoid image as a row, and the distance between data points (pixels) is calibrated by an amplification factor $Mc_x$ for a transversal (x-axis) trapezoid calibration, and the calibration method is expressed in Equation (1) below:

$$Mc_x = \frac{1}{1 - \frac{p-q}{p}\frac{c_x}{h}} \quad (1)$$

where, p is the half length of the bottom edge of the longitudinal trapezoid image, $C_x$ is the distance between the bottom edge and the row to be calibrated of the transversal trapezoid image, q is the half length of the top edge of the transversal trapezoid image, h is the height of the transversal trapezoid image, and $Mc_x$ is the amplification factor of the distance between the transversal data points.

The trapezoid calibration can be used for a transversal trapezoid calibration as shown in FIG. 6, the distance between data points (pixels) is amplified by the amplification factor $Mc_y$ for the longitudinal (y-axis) trapezoid calibration, and the calibration method can be expressed by Equation (2) below:

$$Mc_Y = \frac{1}{1 - \frac{p-q}{p}\frac{c_y}{h}} \quad (2)$$

where, p is the half length of the bottom edge of the longitudinal trapezoid image, $C_y$ is the distance between of the bottom edge and the row to be calibrated of the transversal trapezoid image, q is the half length of the top edge of the longitudinal trapezoid image, h is the height of the longitudinal trapezoid image, and $Mc_y$ is the amplification factor of the distance between the transversal data points.

Figure 19:
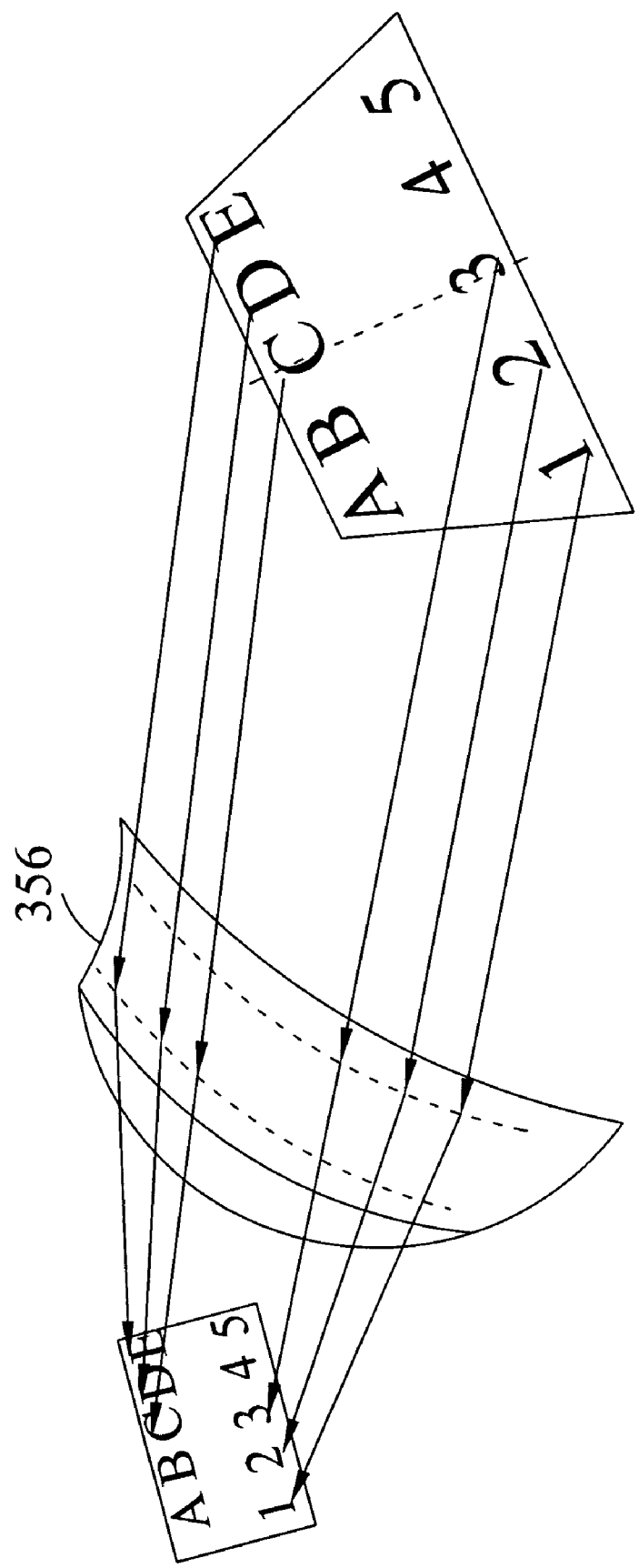
FIG. 19 is a schematic view of a fθ lens of a scanner that calibrates a trapezoid image in accordance with the present invention.

Alternative the trapezoid calibration, a fθ lens can be installed in the imaging lens unit of the image sensing module as shown in FIG. 19, and the fθ lens is formed by an anamorphic optical surface, a toric optical surface or any other optical surface in a different shape, such that different curvatures gives different refractive angles to increase the distances between two points for a different refractive angle to calibrate a trapezoid document image. The fθ lens is composed of two optical aspherical curved surfaces, respectively: x-axis or y-axis aspherical curved surfaces as shown in the following equations:

1: Anamorphic Equation $$Z = \frac{(Cx)X^2 + (Cy)Y^2}{1 + \sqrt{1 - (1+Kx)(Cx)^2 X^2 - (1+Ky)(Cy)^2 Y^2}} + \\ A_R[(1-A_P)X^2 + (1+A_P)Y^2]^2 + B_R[(1-B_P)X^2 + (1+B_P)Y^2]^3 + \\ C_R[(1-C_P)X^2 + (1+C_P)Y^2]^4 + D_R[(1-D_P)X^2 + (1+D_P)Y^2]^5 \quad (3)$$

where, Z is the distance (SAG) from any point on the lens along the optical axis to the tangent plane of the origin 0; $C_x$ and $C_y$ are curvatures along the X-axis and Y-axis respectively; $K_x$ and $K_y$ are conic coefficients along the X-axis and Y-axis respectively; $A_R, B_R, C_R$ and $D_R$ are $4^{th}, 6^{th}, 8^{th}$ and $10^{th}$ order deformations from the conic of the rotationally symmetric components respectively; $A_P$, $B_P$, $C_P$ and $D_P$ are $4^{th}$, $6^{th}$, $8^{th}$ and $10^{th}$ order deformations from the conic of the non-rotationally symmetric components; if $C_x=C_y$, $K_x=K_y$, and $A_P=B_P=C_P=D_P=0$, then the surface is simplified to a single aspherical surface.

2: T oric Equation $$Z = Zy + \frac{(Cxy)X^2}{1+\sqrt{1-(Cxy)^2 X^2}} \quad (4)$$

$$Cxy = \frac{1}{(1/Cx) - Zy}$$

$$Zy = \frac{(Cy)Y^2}{1+\sqrt{1-(1+Ky)(Cy)^2 Y^2}} + B_4 Y^4 + B_6 Y^6 + B_8 Y^8 + B_{10} Y^{10}$$

Z is the distance (SAG) from any point on the lens along the optical axis to the tangent plane of the origin 0; $C_y$ and $C_x$ are curvatures along the Y-axis and X-axis respectively; $K_y$ is conic coefficient along the Y-axis; $B_4$, $B_6$, $B_8$ and $B_{10}$ are $4^{th}$, $6^{th}$, $8^{th}$ and $10^{th}$ order deformations from the conic of the rotationally symmetric components respectively; if $C_x=C_y$ and $K_y=A_P=B_P=C_P=D_P=0$, then the surface is simplified to a single spherical surface.

Since the fθ lens has an aspherical optical surface, the document image incident at the fθ lens is refracted to different angles according to the curved surface of the aspherical optical surface to calibrate the distance between optical points of the pixel unit of each row for a trapezoid calibration.

Figure 7:
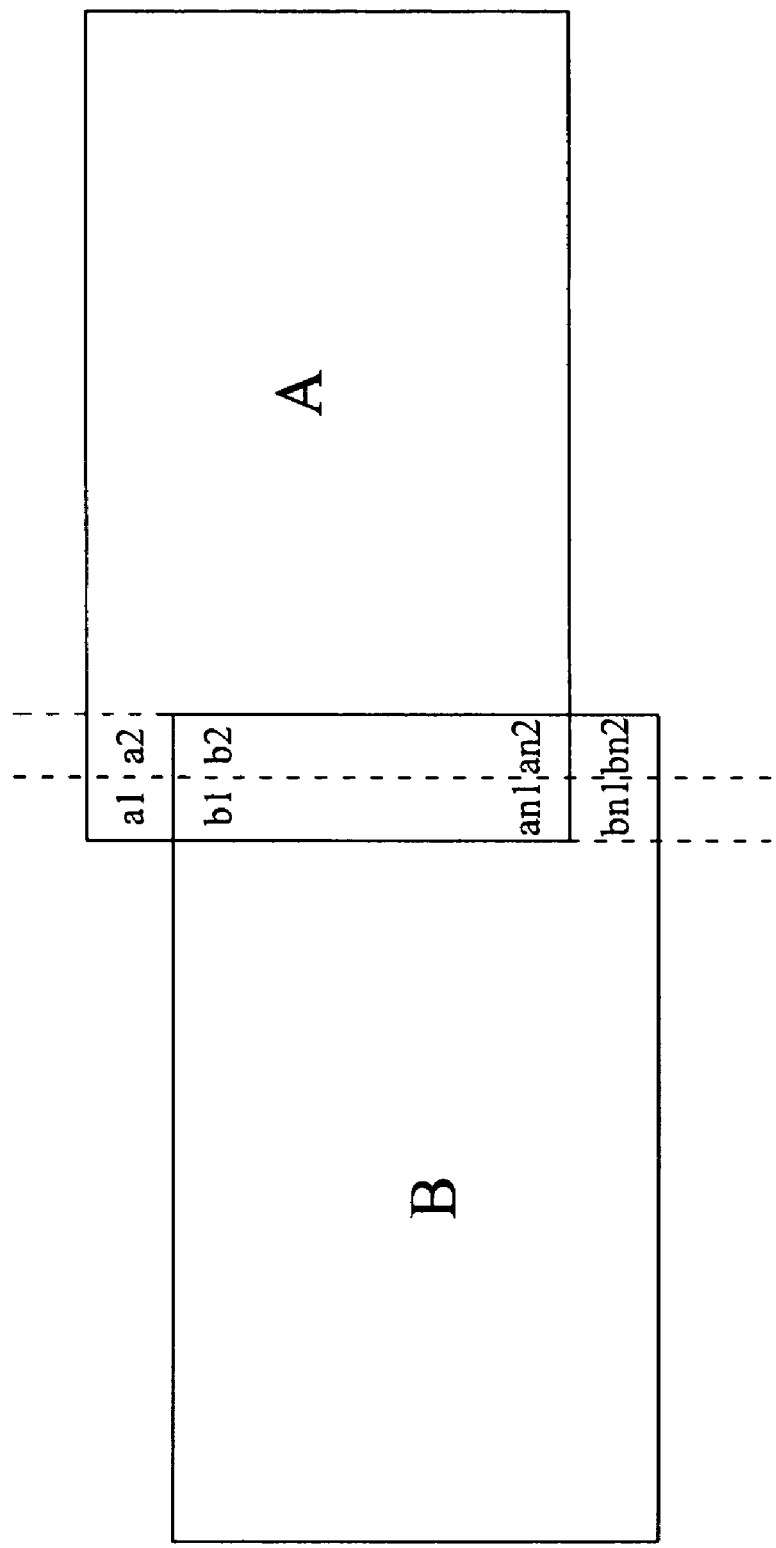
FIG. 7 is a schematic view of an optimal elimination calibration method of an image processing module in accordance with the present invention.

With reference to FIG. 7 for the detailed description of an optimal elimination calibration method of an image processing module in accordance with the present invention, A and B are overlapped first document image and second document image, and a portion of the pixels $a_1$ of the first document image A and the pixels $b_1$ of the second document image B are overlapped, and the image processing module selects a portion having a better image quality from the overlapped portion. From the overlapped portion of the pixels $a_2$ of the first document image A and the pixels $b_2$ of the second document image B, the image processing module selects a portion having a better image quality for eliminating the repeated portion for the two document images A, B and construct the two document images A, B into an image.

Figure 8:
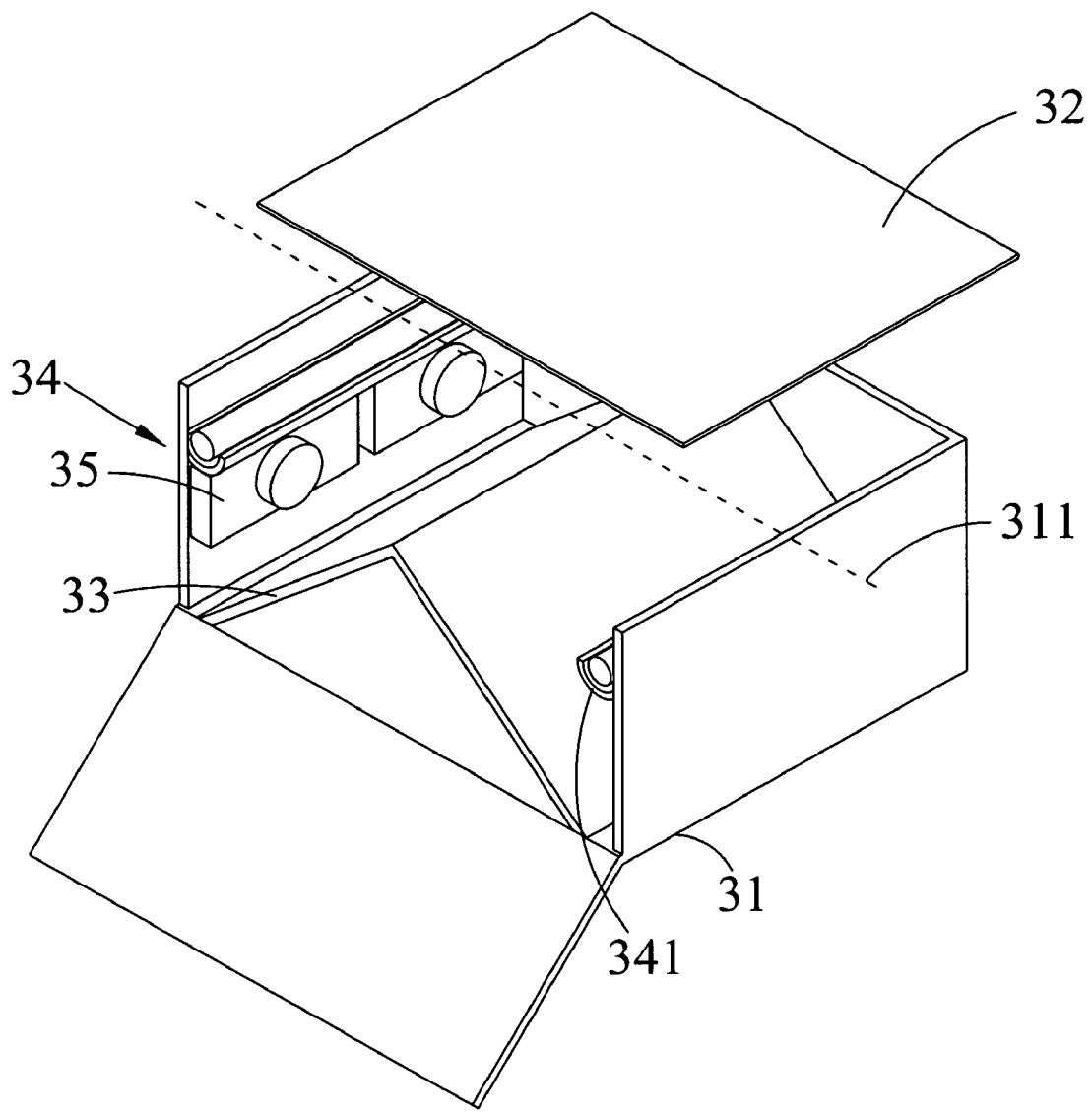
FIG. 8 is a perspective view of a scanner in accordance with a first preferred embodiment of the present invention.

With reference to FIG. 8 for a perspective view of a scanner in accordance with a first preferred embodiment of the present invention, the scanner comprises a frame 31, a transparent plate 32, two reflecting mirrors 33, two light source modules 34 and four image sensing modules 35. The transparent plate 32 is installed on the frame 31, and the top of the transparent plate 32 is provided for placing a document 36. The reflecting mirrors 33 is tapered from both ends of the bottom of the frame 31 towards the center to form an angle φ with the transparent plate 32, and the reflecting mirrors 33 and the distribution line 311 define four image areas 37. The light source module 34 includes a reflecting lens 341 for collecting and projecting the light onto the document 36, and the reflected light of the document 36 is reflected from the reflecting mirrors 33 to form a virtual image. According to the four sensing areas 37 defined by the distribution line 311, images are captured by the four image sensing modules 35.

Figure 9:
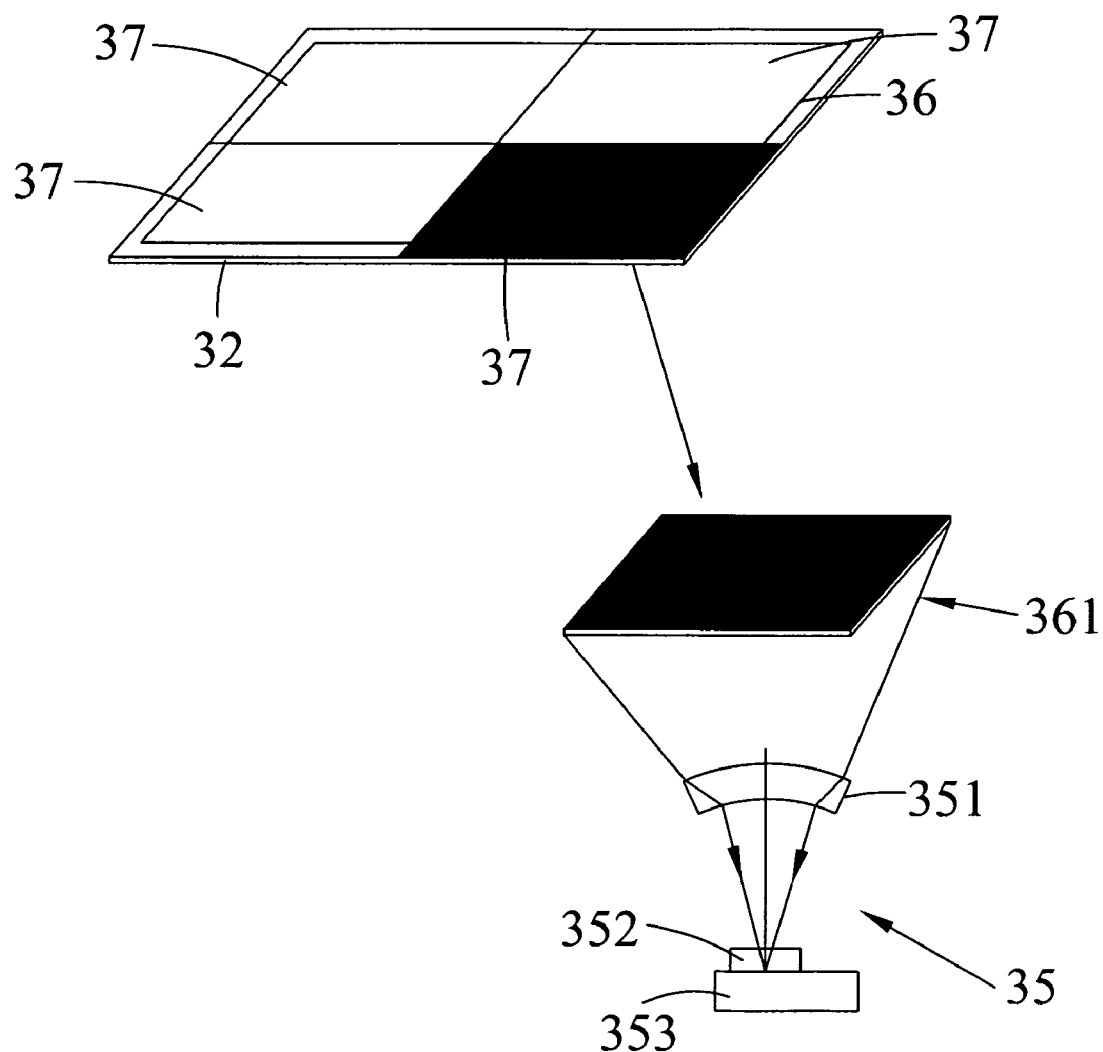
FIG. 9 is a schematic view of forming an image by a scanner in accordance with the present invention.
Figure 10:
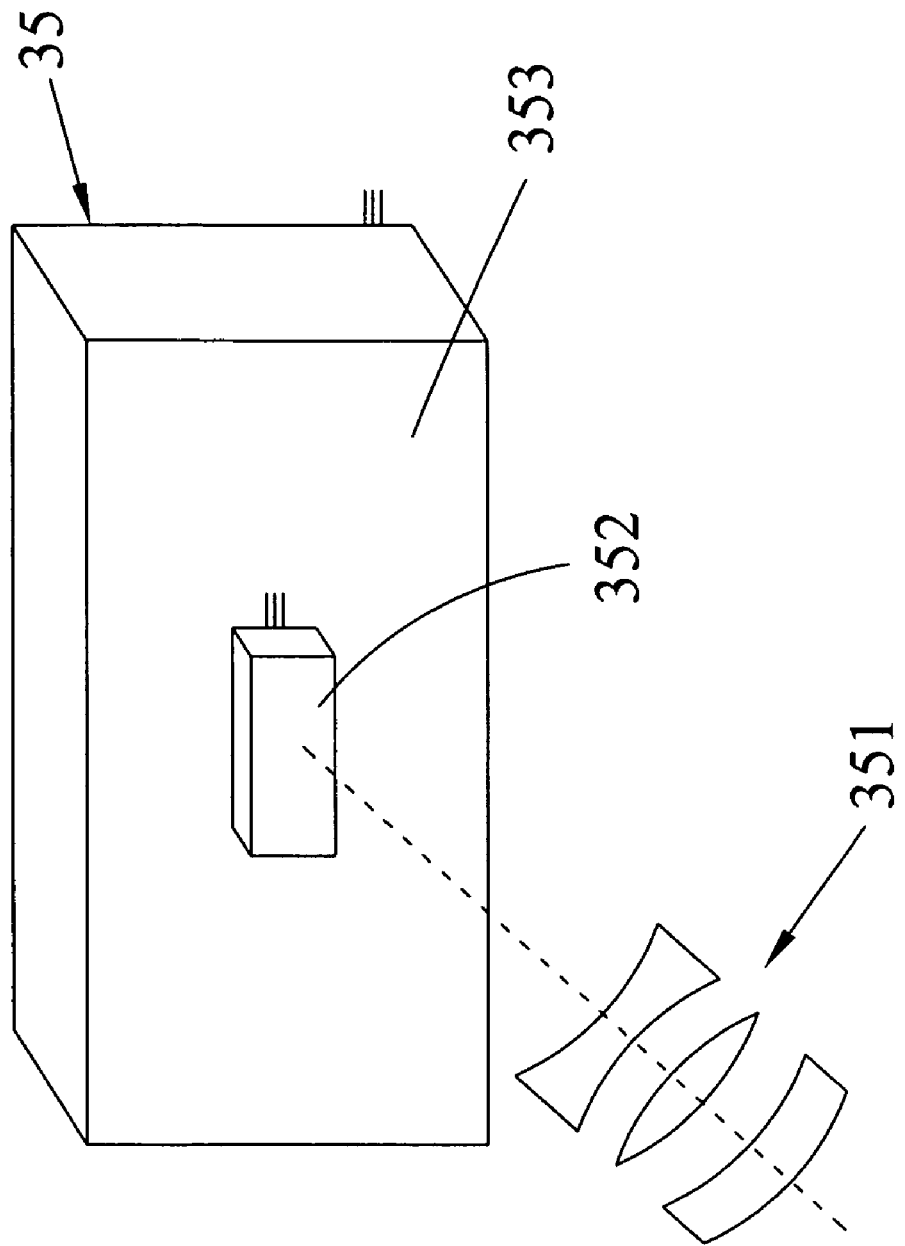
FIG. 10 is a schematic view of an image sensing module of a scanner in accordance with the present invention.

With reference to FIGS. 9 and 10 for a schematic view of forming an image by a scanner and a schematic view of an image sensing module of the present invention respectively, the image sensing module 35 comprises an imaging lens unit 351, an area image sensor 352 and a printed circuit board 353, wherein the area image sensor 352 can be an area image sensor. The image sensing module 35 is installed separately on both sides of the frame 31, and corresponding to the sensing area 37. The imaging lens units (or lenses) 351 are installed at the bottom of the document 36 for focusing the scan light onto the area image sensor 352. The printed circuit board 353 is provided for carrying and electrically coupling the area image sensor 352 and an image processing unit (not shown in the figure). In FIG. 9, the target scanning document 36 can be distributed into four image areas 37, and after each image area 37 is illuminated, the image in each image area 37 reflected by the reflected light source 361 from a reflecting mirror (not shown in the figure) are formed on the area image sensor 352 by an imaging lens unit 351 of the image sensing module 35, and transmitted to the outside through the printed circuit board 353.

Figure 11:
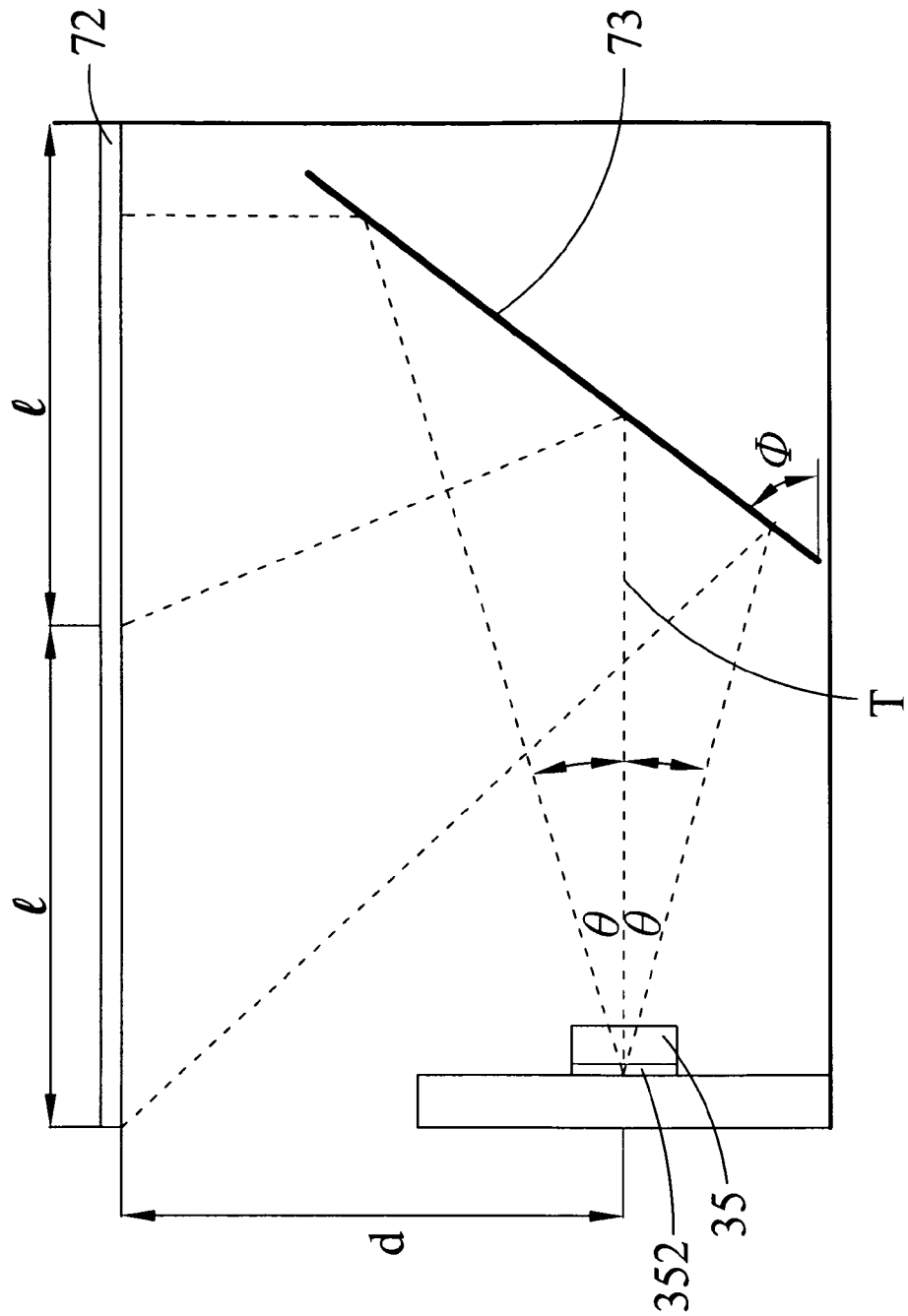
FIG. 11 is an optical path of a scanner in accordance with the present invention.

With reference to FIGS. 8 and 11 for forming an image by a scanner in accordance with the present invention, FIG. 11 shows an optical path of a scanner of the invention, and an image area 37 is used for illustrating the invention. An area image sensor 352 of the image sensing module 35 is installed at the bottom of the image area 37, wherein d is the vertical distance between the center of the area image sensor 352 and the document 36, and the image sensing module 35 is aligned horizontally towards the reflecting mirrors 73. In different applications, the image sensing module 35 can be aligned towards the reflecting mirror 73 with different angles. Symmetric reflecting mirrors 73 can be used for forming virtual images from the images of the image areas 37, and the image sensing module 35 captures and converts the virtual image into a image signal. To complete capturing the images of the image areas 37, that designs the field of view (FOV) and the effective focal length of the imaging lens unit 351 of the image sensing module 35 according to the following equations:

$$\tan\theta > \frac{l \cdot \cos\phi}{T + \frac{d}{\cos\phi}} + \frac{0.15}{T} \quad (5)$$

$$EFL = \frac{Y}{\tan\theta} \quad (6)$$

where, θ is the half field of view of the image sensing module imaging lens unit, φ is the angle between the reflecting mirror and the desired scanning document, l is the half diagonal length of the image area, T is the distance from the area image sensor of the image sensing module along the optical axis of the image lens of the image sensing module to the surface of the reflecting mirrors, d is the vertical distance from the center of the area image sensor to the bottom side of the document, Y is the half diagonal length of the area image sensor effective sensing surface, and EFL is the effective focal length of the imaging lens unit as shown in FIG. 11.

To make it easier to understand the field of view and the effective focal length of the image lens of the image sensing module of the scanner, we use an A4 sized document divided into four image areas 37 for the illustration, and each image area 37 is divided with an equivalent size of about 150 mm×105 mm, a diagonal length 2l=181.8 mm, a vertical distance d=60 mm, and a distance T=96.5 mm from the area image sensor 352 to the surface of the reflecting mirrors 73, and a CCD of 5 mega pixels and a 2.5" area image sensor 352 are used, and its effective diagonal length 2Y=6.4 mm, and the effective included angle between the reflecting mirror 73 and the horizon is 30°. In Equation (1), an imaging lens unit 351 with a field of view equal to 56° and an effective focal length equal to 6.018 mm can be selected. The field of view of this embodiment satisfies the conditions of Equation (5), and EFL can be calculated by Equation (6).

$$\frac{1}{2}FOV = \theta = 28° > \tan^{-1}\left(\frac{l \cdot \cos\phi}{T + \frac{d}{\cos\phi}} + \frac{0.15}{T}\right)$$

$$EFL = \frac{Y}{\tan\theta} = 6.018 \text{ mm}$$

In this embodiment, the scanner using the shared image scanning method of the invention is designed according to A4 sized documents, and the optical parameters for the imaging lens unit 351 designed for different angles φ of the reflecting mirrors 33 and different positions of the image sensing modules 35 are listed in Table 1:

TABLE 1

List of Parameters Used in Different Applications of First Preferred Embodiment

|  | First Application | Second Application | Third Application |
|---|---|---|---|
| d (mm) | 60.0 | 50.0 | 40.0 |
| φ (deg.) | 30 | 45 | 60 |
| T (mm) | 96.5 | 100.5 | 114.7 |
| θ (deg.) from Eq (5) | 27.56 | 21.81 | 13.58 |
| FOV | 56 | 45 | 30 |
| EFL (mm) | 6.018 | 7.920 | 12.834 |
| Minimum height of frame (mm) | 110.2 | 90.0 | 67.6 |

Figure 12:
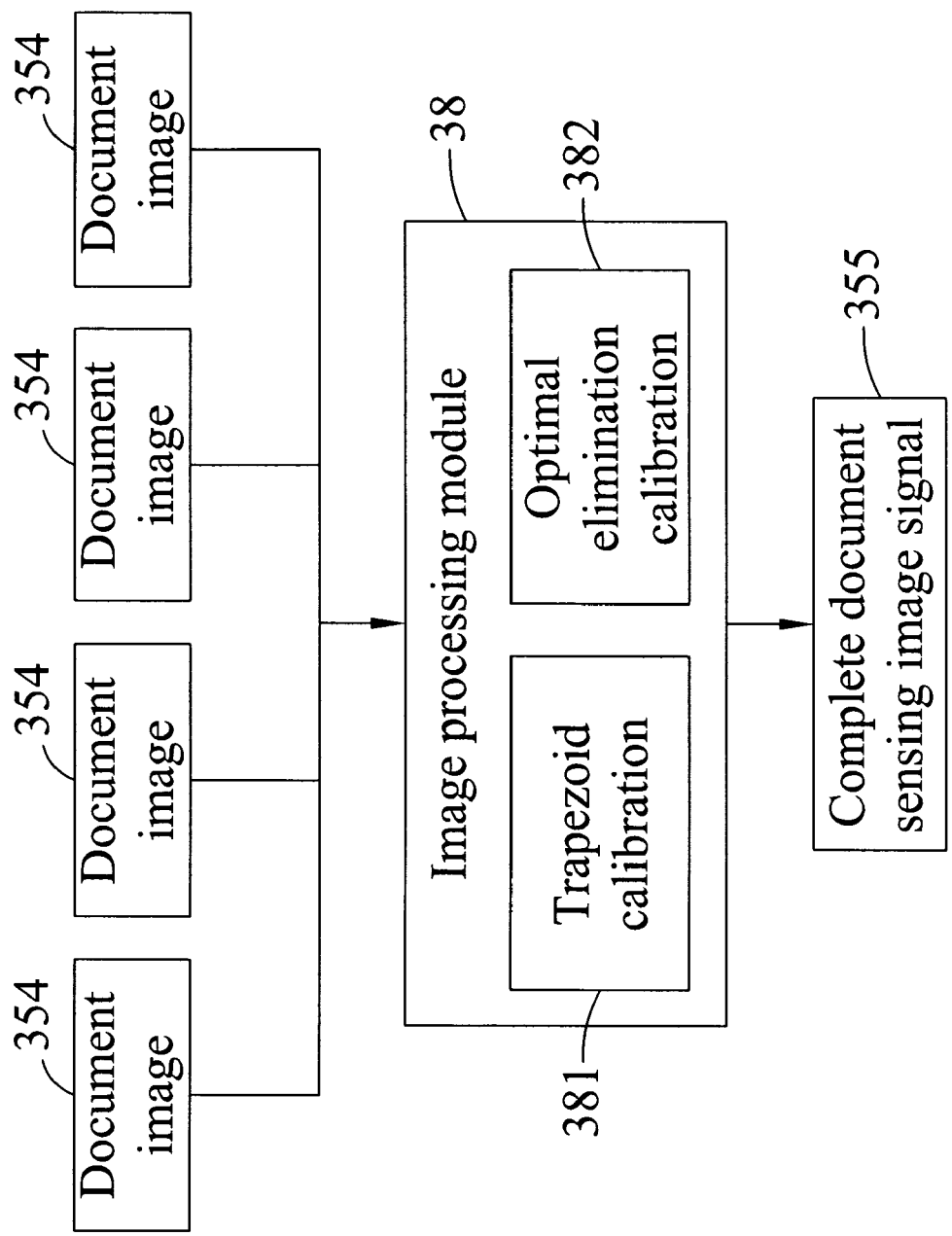
FIG. 12 is a schematic view of an image processing of a scanner in accordance with the present invention.

With reference to FIGS. 8 and 12 for schematic views of an image processing of a scanner in accordance with the present invention, when the scanner performs a scan, the light source module 34 is used for generating a light source to project a light onto a document 36. Since the light source 361 reflected from the document 36 is passed through the sensing area 37 to produce four document images 354, the document images 354 are converted into image signals by the image sensing module 35, and an image processing is performed for each image signal by an image processing module 38 to output a whole document sensing image signal 355. The image processing module 38 further comprises a trapezoid calibration 381 or/and an optimal elimination calibration 382. For different purposes, the light source module 34 can be a cold cathode fluorescent lamp, an LED lamp or a xenon lamp.

Figure 13:
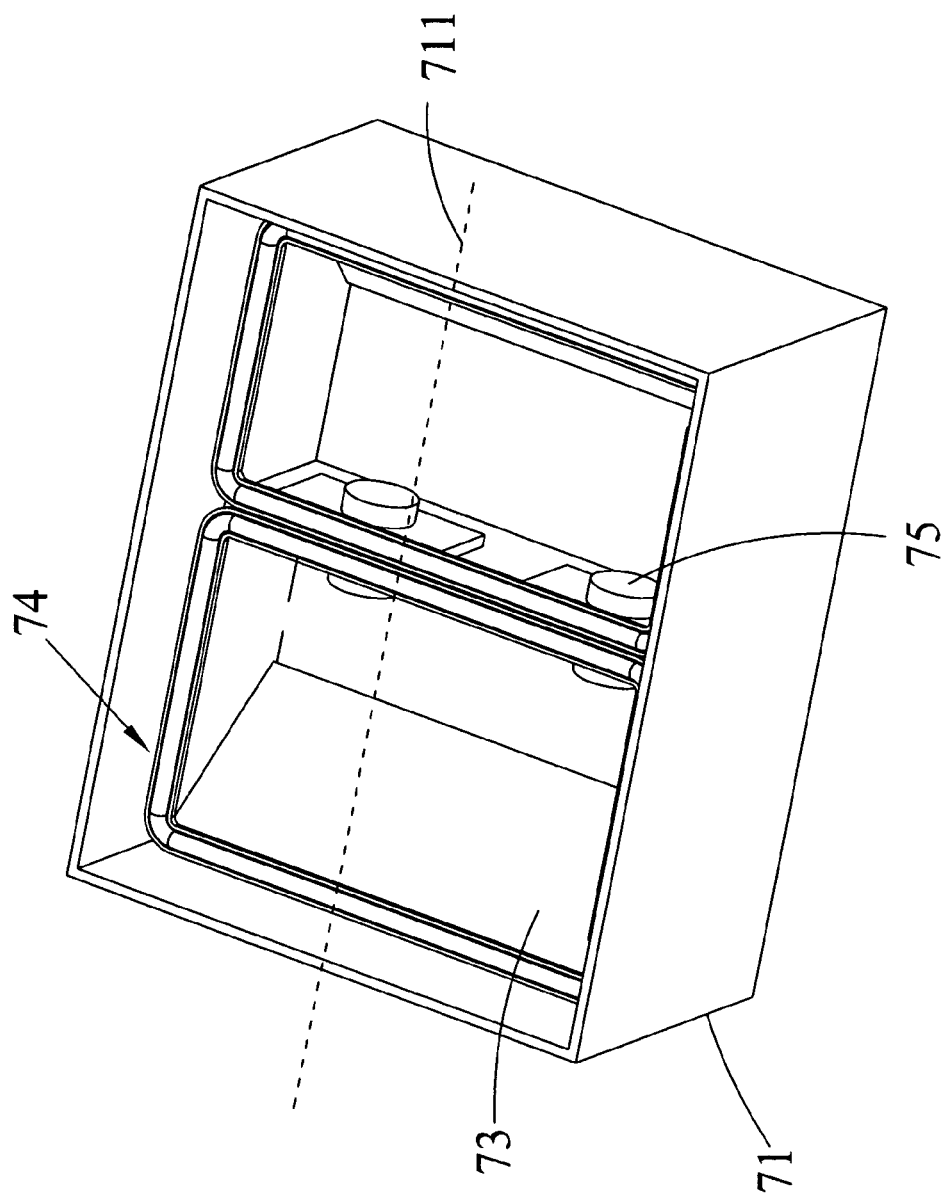
FIG. 13 is a perspective view of a scanner in accordance with a second preferred embodiment of the present invention.
Figure 14:
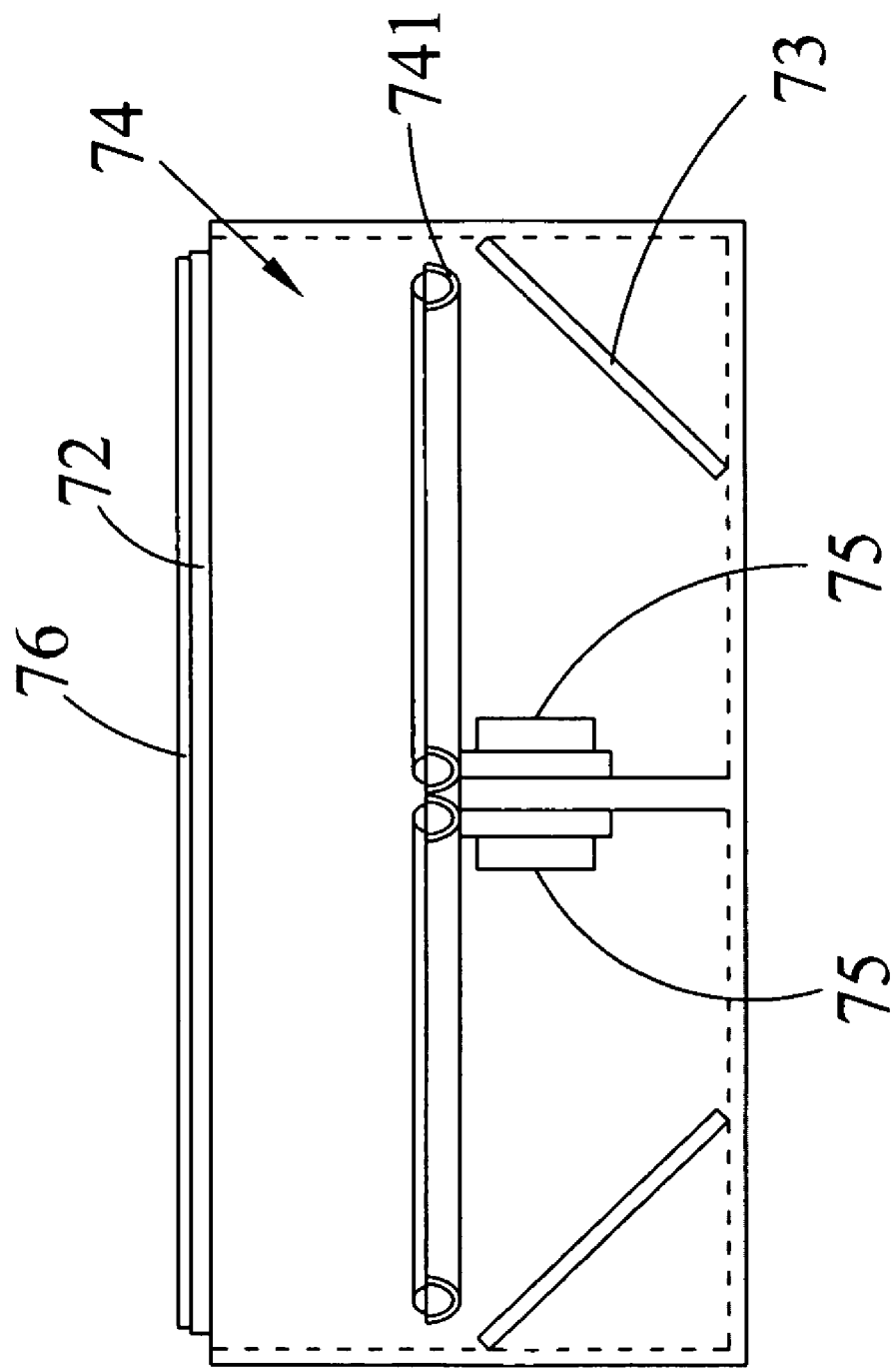
FIG. 14 is a side view of a scanner in accordance with a second preferred embodiment of the present invention.
Figure 15:
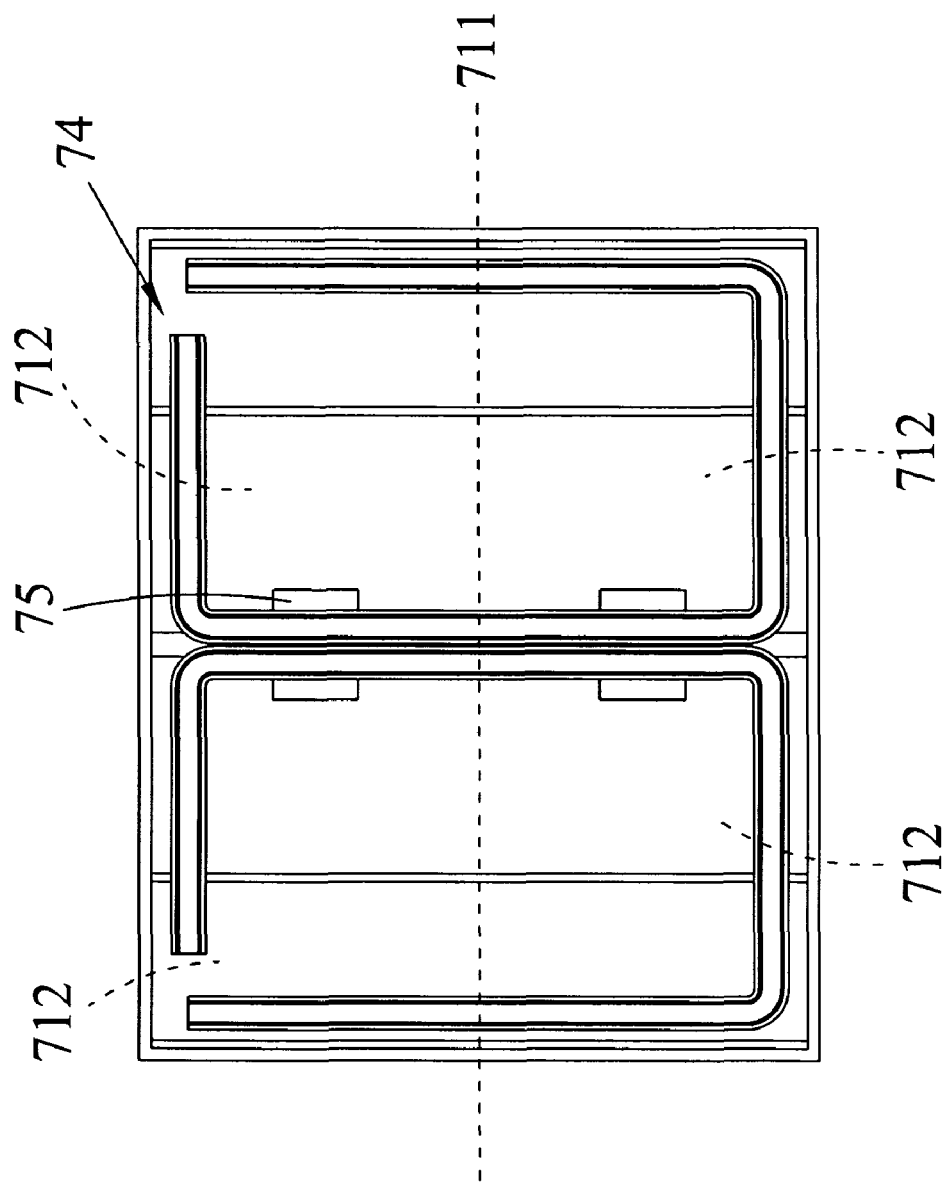
FIG. 15 is a top view of a scanner in accordance with a second preferred embodiment of the present invention.
Figure 16:
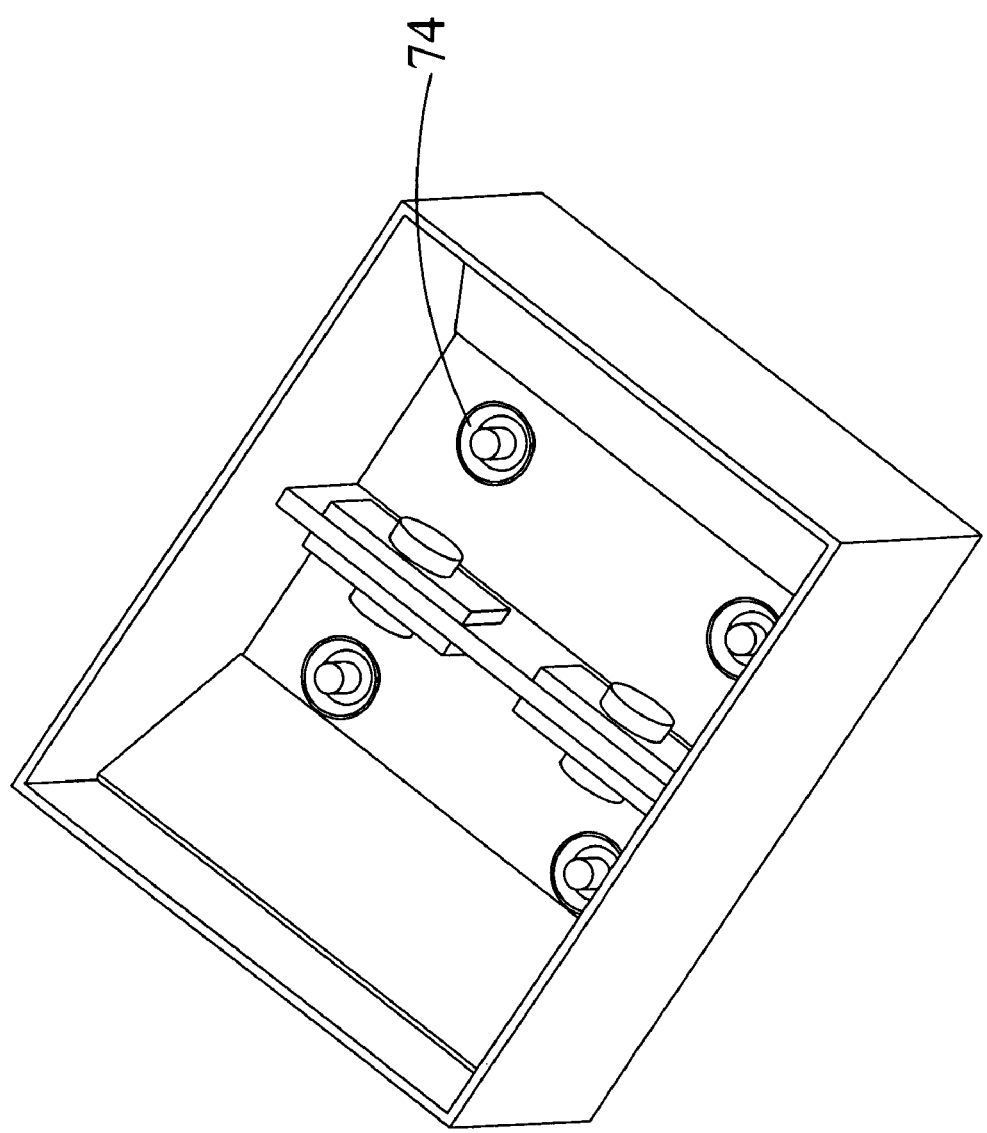
FIG. 16 is a schematic view of a scanner adopting an LED lamp as a light source in accordance with a second preferred embodiment of the present invention.

With reference to FIGS. 13, 14 and 15 for a perspective view, a side view and a top view of a scanner in accordance with a second preferred embodiment of the present invention respectively, the scanner comprises a frame 71, a transparent plate 72, two reflecting mirrors 73, two light source modules 74 and four image sensing modules 75. The difference of this embodiment from the first preferred embodiment resides on that the four image sensing modules 75 are arranged at the center of the scanner, and the reflecting mirrors 73 are installed on both sides of the scanner. In this embodiment, the transparent plate 72 is installed at the top of the frame 71 for carrying a document 76. The reflecting mirrors 73 are installed with an interval apart from each other in the frame 71 and extended from the bottom towards an external side of the frame 71, and the reflecting mirrors 72 and the distribution line 711 are distributed into four sensing areas 712. The light source modules 74 are disposed around an upper distal portion of the image sensing module 75 and in the frame 71 for providing a light source to the document 76, and include a reflecting cover 741 for collecting and projecting the light source onto the document 76, and preventing bright spots formed on the reflecting mirrors 72. The scanning method of the second preferred embodiment is the same as the image processing method of the first preferred embodiment, and thus will not be described here again. The light source module 74 using an LED lamp as a light source is shown in FIG. 16.

In this embodiment, a scanner using the shared image scanning method of the invention is designed according to the A3 sized document, and the optical parameters for the imaging lens unit 351 designed for different angles φ of the reflecting mirrors 33 and different positions of the image sensing modules 35 are listed in Table 2 below:

TABLE 2

List of Parameters Used in Different Applications of Second Preferred Embodiment

|  | First Application | Second Application | Third Application |
|---|---|---|---|
| d (mm) | 60.0 | 50.0 | 40.0 |
| φ (deg.) | 30 | 45 | 60 |
| T (mm) | 96.5 | 100.5 | 114.7 |
| θ (deg.) from Eq. (5) | 38.58 | 30.52 | 19.00 |
| FOV | 78 | 62 | 38 |
| EFL (mm) | 3.952 | 5.326 | 9.293 |
| Minimum height of frame (mm) | 136.8 | 109.1 | 79.3 |

Figure 17:
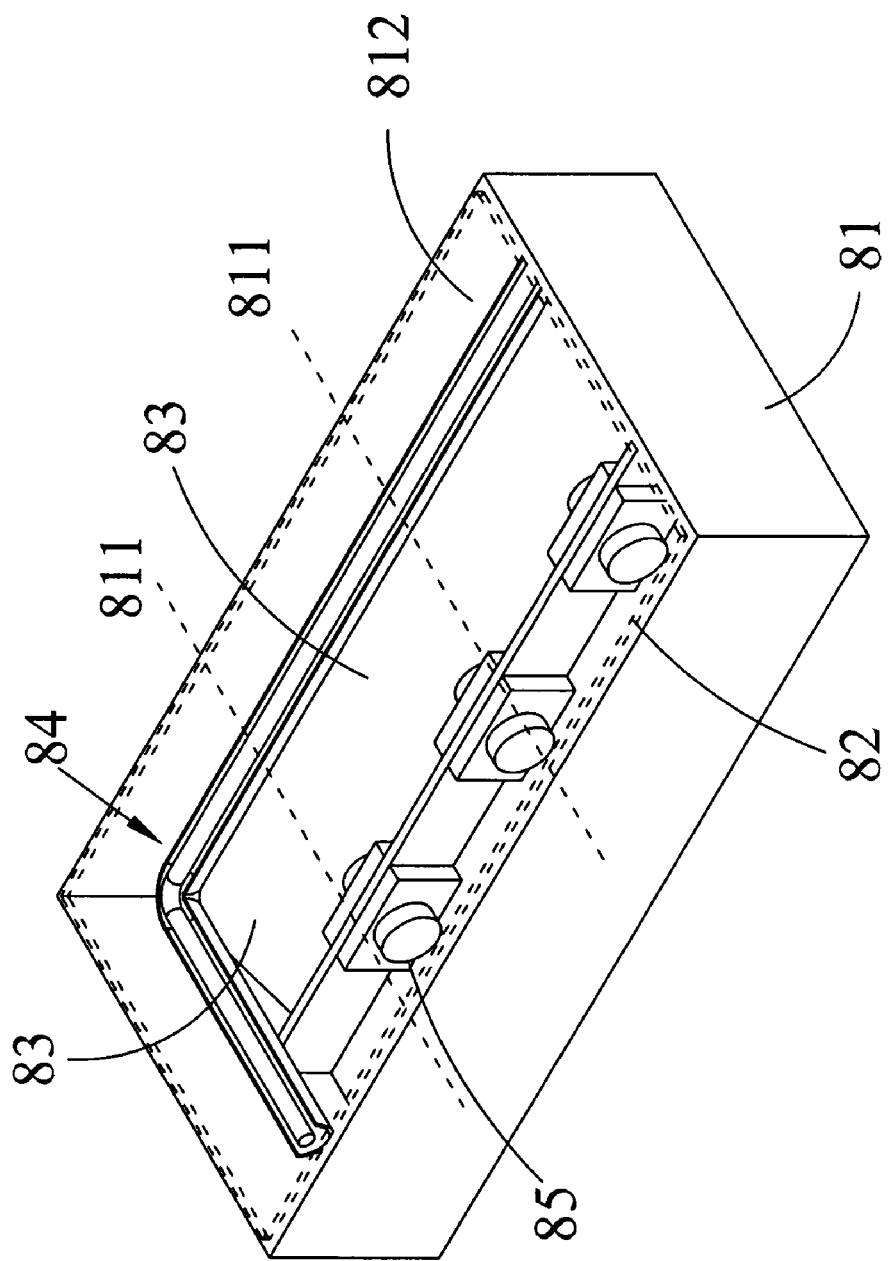
FIG. 17 is a perspective view of a scanner in accordance with a third preferred embodiment of the present invention.
Figure 18:
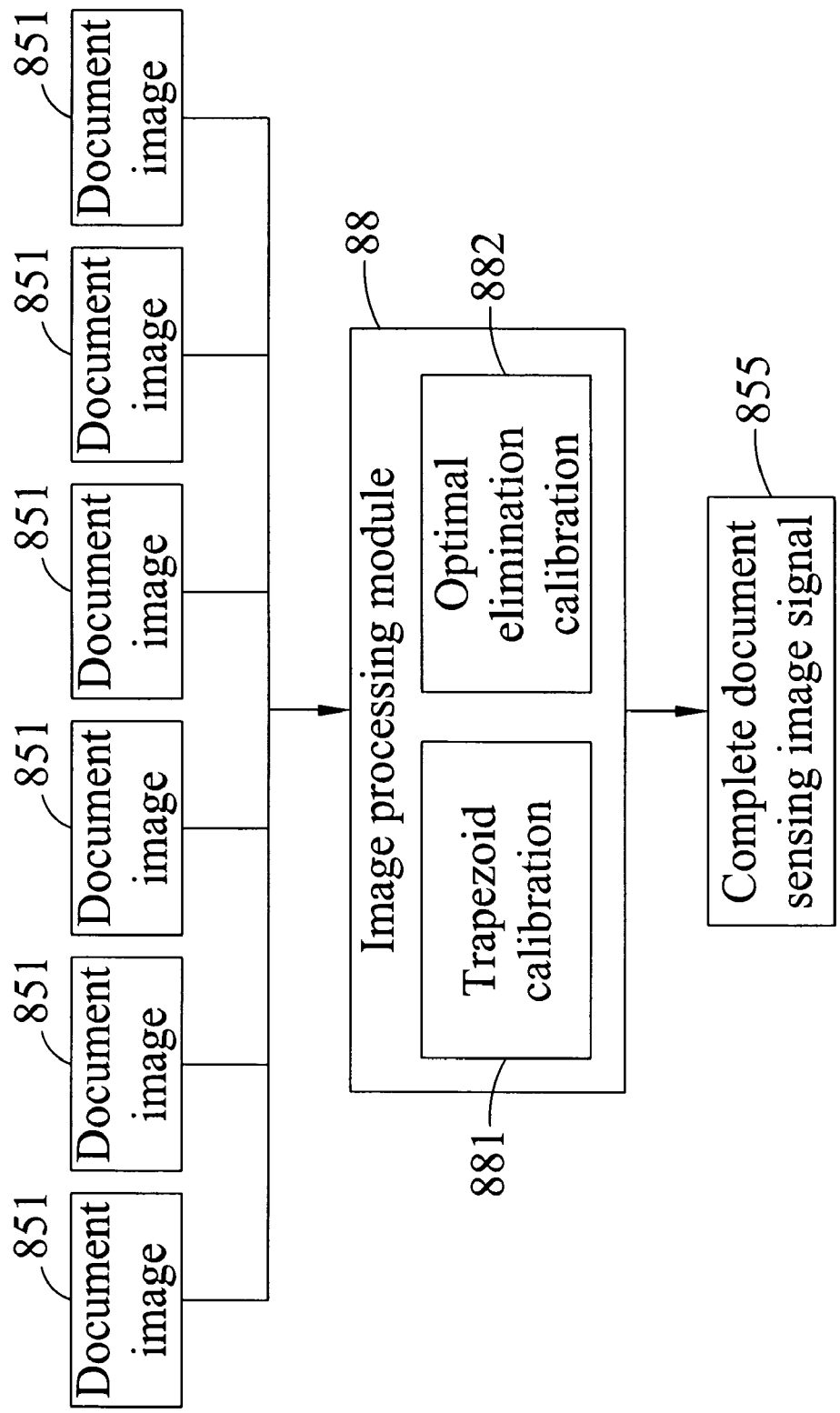
FIG. 18 is a schematic view of an image processing of a scanner in accordance with a third preferred embodiment of the present invention.

With reference to FIGS. 17 and 18 for a perspective view of a scanner in accordance with a third preferred embodiment of the present invention and a schematic view of an image processing of the invention respectively, the scanner comprises a frame 81, a transparent plate 82, two reflecting mirrors 83, a light source module 84 and three image sensing modules 85. The difference between the third preferred embodiment and the second preferred embodiment resides on that the two distribution lines 811, the reflecting mirrors 83 and the distribution lines 811 are used for defining six image areas 812. If the document is scanned, the light source module 84 is driven for generating a light source to project a light onto a document, and the light is reflected from the document and passed through the image area 812 and incident into the corresponding image sensing module 85 for producing six document images 851. The image sensing module 85 further comprises a fθ lens 356 installed between an imaging lens unit (not shown in the figure) of the image sensing module 85 and the reflecting mirrors 83, and the fθ lens 356 is capable of calibrating transversal (y-axis) and/or longitudinal (x-axis) image curvatures as shown in FIG. 19. In FIGS. 18 and 19, after the document image 851 is synthesized and processed by an image processing module 88, a whole document sensing image signal 855 is outputted. The fθ lens 356 is designed with an aspherical curved surface by the transversal amplification factor Mcx of Equation (1) and the longitudinal amplification factor Mcy of Equation (2) for changing the angle-distance relation into a distance relation. In this embodiment, the trapezoid image calibration can be alternative the fθ lens 356 using, the image sensing module can be used for the trapezoid calibration 881.

In this embodiment, the positional relation between the reflecting mirrors 83 and the image sensing module 84 and the optical path are shown in FIG. 11, and the scanner is designed according to A3 sized documents, and the optical parameters for the imaging lens unit 351 designed for different angles φ of the reflecting mirrors 85 and different positions of the image sensing modules 86 are listed in Table 3 below:

TABLE 3

List of Parameters Used in Different Applications of Third Preferred Embodiment

|  | First Application | Second Application | Third Application |
|---|---|---|---|
| d (mm) | 60.0 | 50.0 | 40.0 |
| φ (deg.) | 30 | 45 | 60 |
| T (mm) | 89.4 | 91.6 | 94.3 |
| θ (deg.) from Eq. (5) | 32.18 | 25.70 | 16.95 |
| FOV | 66 | 52 | 34 |
| EFL (mm) | 4.927 | 6.561 | 10.467 |
| Minimum height of frame (mm) | 116.1 | 94.0 | 68.6 |

In summation of the description above, the scanner has an effect of receiving a light source directly from the image sensing module, and using the image processing module to process, compute, and merge the document images, without the need of using a guide track for scanning the document, so as to expedite the scanning.

The scanner of the invention has another effect of scanning the document by the image sensing module without the need of using the guide track for scanning the document, and thus the invention can prevent vibrations produced by the guide track or adverse affections to the scanning quality.

The scanner of the invention has a further effect of using the reflecting mirrors to form images of the document to increase the image distance, so as to reduce the field of view for scanning a document having a folded line.

What is claimed is:

1. A shared image scanning method, applied in a scanner, and the scanner having at least one light source module, a plurality of reflecting mirrors, a plurality of image sensing modules and an image processing module, and the shared image scanning method comprising the steps of:
   sharing a document into a plurality of image areas;
   aligning the reflecting mirrors and the image sensing modules in the corresponding image areas;
   turning on the light source module to project the document of each image area to form a document image of each image area;
   reflecting the document images to the image sensing modules by the reflecting mirrors respectively;
   converting the document image into image signal by the image sensing module; and
   constructing the image signal by the image processing module to form a whole document sensing image signal.

2. The shared image scanning method of claim 1, wherein the image processing module calibrates the image signal by a trapezoid calibration method.

3. The shared image scanning method of claim 2, wherein the trapezoid calibration method calibrates a transversal trapezoid image, and the transversal trapezoid image defines a pixel unit at a bottom edge and a top edge of each parallel transversal trapezoid image as a column, and satisfies the condition of:

$$Mc_x = \frac{1}{1 - \frac{p-q}{p}\frac{c_x}{h}};$$

wherein p is the half length of the bottom edge of the transversal trapezoid image, $C_x$ is the column distance of the bottom edge of the transversal trapezoid image, q is the half length of the top edge of the transversal trapezoid image, h is the height of the transversal trapezoid image, and $Mc_x$ is the amplification factor of the transversal distance between the data points of this column.

4. The shared image scanning method of claim 2, wherein the trapezoid calibration method calibrates a longitudinal trapezoid image, and the longitudinal trapezoid image defines a pixel unit at the bottom edge and the top edge of each parallel longitudinal trapezoid image as a column, and satisfies the condition of:

$$Mc_Y = \frac{1}{1 - \frac{p-q}{p}\frac{c_y}{h}};$$

wherein p is the half length of the bottom edge of the longitudinal trapezoid image, $C_y$ is the column distance of the bottom edge of the longitudinal trapezoid image, q is the half length of the top edge of the longitudinal trapezoid image, h is the height of the transversal trapezoid image, and $Mc_y$ is the amplification factor of the transversal distance between the data points of this column.

5. The shared image scanning method of claim 1, wherein the image processing module is using optimal elimination calibration method to calibrate and construct the overlaped images.

6. A scanner, comprising:
   a frame;
   a plurality of reflecting mirrors, installed with an interval apart from each other in the frame, for sharing a plurality of image areas;
   a light source module, having at least one light source, and installed in the frame;
   a plurality of image sensing modules, installed in the frame, for converting a plurality of document images of the corresponding image area into image signals; and
   an image processing module, for receiving a plurality of image signals of the image sensing modules for an image processing;
   wherein the light source is projected onto a document, and the document images are produced according to the image areas, and each document image is reflected from the reflecting mirrors to the image sensing modules respectively, and the document images are converted into a plurality of image signals by the image sensing modules, and each image signal is used by the image processing module for an image processing to output a whole document sensing image signal.

7. The scanner of claim 6, wherein the light source is one selected from the collection of a cold cathode fluorescent lamp, an LED lamp and a xenon lamp.

8. The scanner of claim 6, wherein the image processing module further comprises a trapezoid calibration function for performing a trapezoid calibration to the image signal of the document image.

9. The scanner of claim 6, wherein the image sensing module further comprising an image sensing unit and an imaging lens unit.

10. The scanner of claim 9, wherein the imaging lens unit has a field of view and an effective focal length satisfying the conditions of:

$$\tan\theta > \frac{l\cdot\cos\phi}{T+\frac{d}{\cos\phi}} + \frac{0.15}{T}; \text{ where,}$$

$$EFL = \frac{Y}{\tan\theta};$$

wherein θ is the half field of view of the imaging lens unit of the image sensing module, φ is the included angle between the reflecting mirror and the document, l is the half diagonal length of the image area, T is the distance from an optical axis of the center of the image lens of the image sensing module to a surface of the reflecting mirror in the image sensing unit of the image sensing module, d is the vertical distance from the center of the image sensing unit to the bottom surface of the document, Y is the half diagonal length of the effective sensing surface of the image sensing unit, and EFL is the effective focal length of the imaging lens unit.

11. The scanner of claim 9, wherein the image sensing unit is an area image sensor.

12. The scanner of claim 9, wherein the imaging lens unit further includes a fθ lens for performing a trapezoid calibration to the document image reflected by the reflecting mirror.

* * * * *